Sept. 12, 1950     H. J. HORN     2,522,271
COVER FOR VEHICLE WHEELS
Filed June 12, 1947

INVENTOR
HARRY J. HORN
BY
Barnes, Kisselle, Laughlin & Raisch
ATTORNEYS.

Patented Sept. 12, 1950

2,522,271

UNITED STATES PATENT OFFICE 2,522,271

COVER FOR VEHICLE WHEELS

Harry J. Horn, Lansing, Mich., assignor to Motor Wheel Corporation, Lansing, Mich., a corporation of Michigan Application June 12, 1947, Serial No. 754,107

8 Claims. (Cl. 301—37)

This invention relates to a cover for a vehicle wheel and more particularly to a spring clip mechanism for detachably securing a cover plate to a vehicle wheel.

It is common practice to provide vehicle wheels, particularly automotive vehicle wheels, with cover plates primarily for decorative purposes in that they conceal the hub and bolts or cap screws which secure the wheel to the hub.

It is an object of this invention to produce a spring clip mechanism for securing a cover plate to a wheel which is simple, easily assembled to the wheel and will effectively secure the cover plate to the wheel.

My invention contemplates a spring clip mechanism for securing a cover plate to a wheel which lends itself for ready assembly upon the wheel as initial equipment or for subsequent assembly to the wheel after it has been in use as an accessory.

The term "cover" is used herein broadly to include a wheel cover commonly referred to as a hub cap.

Figure 2:
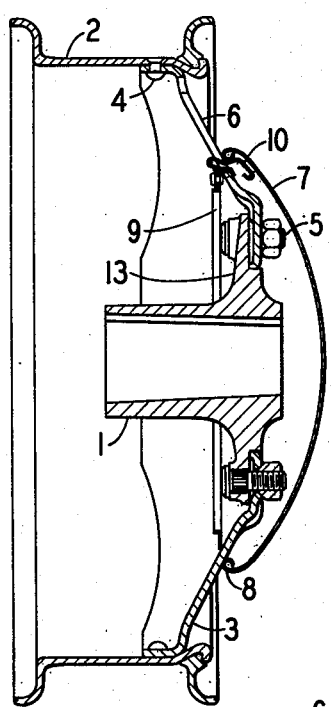
Fig. 2 is a cross section taken on the line 2—2 of Fig. 1.
Figure 1:
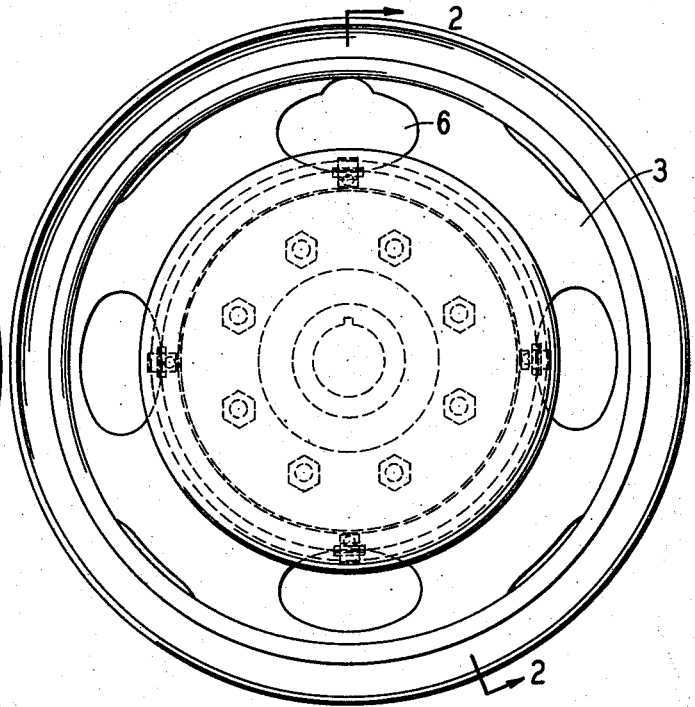
Fig. 1 shows a front elevation of the wheel with the cover assembled to the wheel by my clip mechanism.

In the drawings I have shown a wheel assembly comprising a hub 1, a rim 2 and a pressed steel wheel body 3 secured to rim 2 by rivets 4. Wheel body 3 is secured to hub 1 in a conventional manner by bolts 5.

Wheel body 3 as herein shown is in the form of a pressed steel disk having a plurality of openings 6 therein. For purposes of description, body 3 is shown with four such openings.

Cover plate 7 is in the form of a dished sheet metal stamping having an edge 8 in the form of a circumferential bead.

For retaining cover plate 7 detachably secured to wheel body 3, there is provided an assembly comprising an annular ring 9 which carries a plurality of spring clips 10 and distortable tabs 11. Ring 9 is preferably provided with a flange 12 along its inner circumference and the inside diameter of ring 9 will be greater than the outer diameter of hub flange 13 so that ring 9 will not interfere with assembly of the wheel body to hub 1 or the disassembly therefrom.

Figure 3:
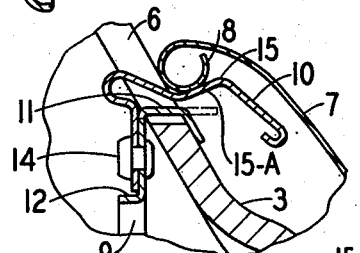
Fig. 3 is an enlarged sectional view of the spring clip as shown in Fig. 2.
Figure 4:
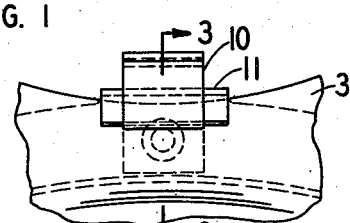
Fig. 4 is an elevation of that portion of the wheel and clip shown in Fig. 3 with the cover removed.

Tabs 11 are preferably formed integral with metal ring 9 but can be made as separate items and attached to the ring by welding or riveting. Tabs 11 are preferably formed of ductile steel and initially project outwardly substantially at right angles to ring 9, as shown in the dotted lines, Fig. 3. Ring 9 is assembled to wheel body 3 by passing tabs 11 through openings 6 and then bending tabs 11 downwardly from the dotted line to the full line showing in Fig. 3 so that the tabs overlap the outer face of the wheel body.

Clips 10 are made from a spring material, such as spring steel, and can be integral with ring 9, but preferably are made as separate spring clip elements and attached to the ring 9 by rivets 14. Each clip 10 is provided with a hump 15 which interengages bead 8 of cover 7 to detachably secure cover plate 7 to wheel body 3.

Figure 5:
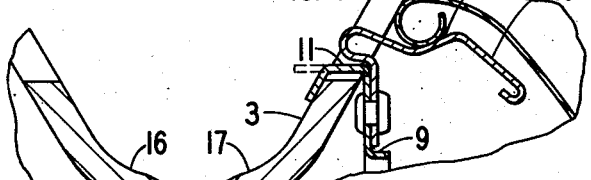
Fig. 5 shows the construction where the spring clip assembly is mounted on the inside of the wheel but on the outside of the dual wheel assembly.
Figure 6:
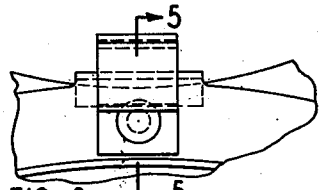
Fig. 6 is an elevation of the construction shown in Fig. 5 with the cover removed.

In Fig. 5 I have shown my spring clip assembly used with the wheel body 3 of the outer of two disk or dual wheels 16 and 17. When my clip assembly is used for retaining a cover on a single wheel, the ring 9 will be mounted on the inside of the wheel body 3 (Fig. 3) whereas when my clip assembly is used with a dual wheel, ring 9 will be mounted on the inside of the wheel body (Fig. 5) but on the outside of the dual wheel assembly and this necessitates reversing clip 10 on ring 9, otherwise the construction is the same as above described.

Figure 7:
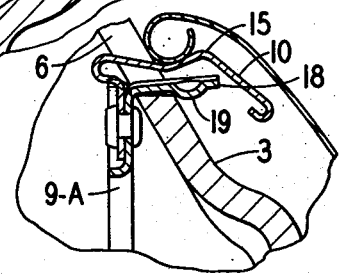
Fig. 7 is a detail sectional view showing a modified form of my invention.
Figure 8:
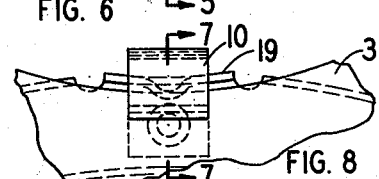
Fig. 8 is an elevation of that portion of the structure shown in Fig. 7.

In Figs. 7 and 8 I have shown a modified form of my invention wherein the ring 9A is of channel section and is provided with a plurality of spring fingers 18 each provided with a hump 19. In assembling ring 9A to wheel body 3, fingers 18 are pressed through, and interengage wheel body 3 in opening 6 with humps 19 interengaging the outer face of body 3 along the lower edge of opening 6. Thus, the modified form, Figs. 7 and 8, substitutes spring clips or fingers 18 for the bendable tabs 11.

It is, of course, understood that there preferably will be a spring clip 10 and a tab 11 or spring finger 18 for each of the openings 6.

With ring 9 assembled to the wheel body, as described above, it will be readily appreciated that cover plate 7 can be snapped over spring clips 10 which cooperate with bead 8 to retain the cover plate in place. As shown, spring clips 10 are positioned ninety degrees (90°) apart about ring 9 and each pair of diametrically opposed clips 10 will be spaced slightly farther apart than the internal diameter of bead 8 so that clips 10 will resiliently interengage bead 8 to detachably lock the cover plate to the wheel body.

It will be noted that face 15A of each clip 10 contacts bead 8 along its inner circumference and tends to cam or urge bead 8 tightly into engagement with the adjacent face of wheel body 3.

I claim:

1. In combination a wheel body having a plurality of circumferentially spaced openings positioned equidistant from the center of the wheel body, an annular ring positioned in co-axial relation with the wheel body and having a plurality of projections projecting through and interengaging the wheel body in said openings for securing the ring to the wheel body, and a plurality of spring clips secured to said ring and extending beyond the outer periphery of said ring, and a cover plate interengaging said spring clips along the inner circumference of said cover for retaining the cover plate on the wheel body and for concealing said ring and clips.

2. In combination a wheel body having a plurality of circumferentially spaced openings, an annular ring positioned in co-axial relation with the wheel body and having a plurality of projections projecting through and interengaging the wheel body for securing the ring to the wheel body, and a plurality of spring clips secured to said ring and projecting outwardly of the wheel body and adapted to interengage a cover plate, said clips projecting beyond the outer circumference of said ring and into said openings in the wheel body.

3. In combination, a disk wheel body having a plurality of circumferentially spaced openings, a ring positioned in co-axial relation with the disk wheel body, a plurality of members carried by said ring and passing through said circumferentially spaced openings and interengaging the wheel body on the side opposite to the side on which the ring is located, and a plurality of spring clips secured to said ring and projecting outwardly therefrom substantially perpendicular to the plane of the ring and projecting outwardly from the wheel body for interengagement with a cover plate, each clip having a return bent portion and projecting into one of said openings in said wheel body.

4. The combination as set forth in claim 3 including a cover plate having a circumferential inwardly turned bead which interengages the spring clips to retain the cover plate on the wheel body, the said clips extending beyond the outer circumference of the ring and the cover extending over the clips to conceal both the ring and the clips.

5. The combination as set forth in claim 3 including a cover plate having a circumferential bead, each of said spring clips having a cam portion which interengages the inner circumference of the bead and tends to cam the beaded edge of the cover plate against the face of the wheel body.

6. In combination, a disc wheel body having a plurality of circumferentially spaced openings, a ring positioned in co-axial relation with the disk wheel body, a plurality of members carried by said ring and passing through said circumferentially spaced openings and inter-engaging the wheel body on the side opposite to the side on which the ring is located, and a plurality of spring clips secured to said ring and projecting outwardly therefrom substantially perpendicular to the plane of the ring and projecting outwardly from the wheel body for interengagement with a cover plate, each spring clip having a corresponding opening in said wheel body, and each spring clip having a return bent section adjacent the periphery of said ring and each spring clip having a portion projecting into the adjacent opening in the wheel body.

7. In combination, a disk wheel body having a plurality of circumferentially spaced openings, a ring positioned in co-axial relation with the disk wheel body, a plurality of spring clip members carried by said ring and passing through said circumferentially spaced openings and interengaging the wheel body on the side opposite to the side on which the ring is located, and a plurality of spring clips secured to said ring and projecting outwardly therefrom substantially perpendicular to the plane of the ring and projecting outwardly from the wheel body for interengagement with a cover plate.

8. In combination, a dished or concave disk wheel body having a plurality of circumferentially spaced openings, a ring positioned in the concave side of, and in co-axial relation with, the disk wheel body, a plurality of members carried by said ring and passing through said circumferentially spaced openings and inter-engaging the wheel body on the side opposite to the side on which the ring is located, a plurality of spring clips secured to said ring and extending beyond the outer circumference of said ring, each spring clip having a return bent portion and projecting into one of said openings in said wheel body, and a cover plate having its circumferential edge interengaged with said spring clips to retain the cover plate on the wheel body, the said cover plate extending beyond and concealing both the ring and the said clips.

HARRY J. HORN.

REFERENCES CITED

The following references are of record in the file of this patent:

UNITED STATES PATENTS

| Number | Name | Date |
| --- | --- | --- |
| 2,202,102 | Horn | May 28, 1940 |
| 2,264,000 | McKechnie | Nov. 25, 1941 |
| 2,361,406 | Lyon | Oct. 31, 1944 |
| 2,368,241 | Lyon | Jan. 30, 1945 |
| 2,410,174 | Lyon | Oct. 29, 1946 |